US012437570B2

(12) United States Patent
Gupta et al.

(10) Patent No.: US 12,437,570 B2
(45) Date of Patent: Oct. 7, 2025

(54) EXPLORATION AND PRODUCTION DOCUMENT CONTENT AND METADATA SCANNER

(71) Applicant: Schlumberger Technology Corporation, Sugar Land, TX (US)

(72) Inventors: Rishabh Gupta, Pune (IN); Swapnil Patel, Pune (IN); Udit Sinha, Brisbane (AU)

(73) Assignee: Schlumberger Technology Corporation, Sugar Land, TX (US)

( * ) Notice: Subject to any disclaimer, the term of this patent is extended or adjusted under 35 U.S.C. 154(b) by 225 days.

(21) Appl. No.: 18/260,526

(22) PCT Filed: Jan. 7, 2022

(86) PCT No.: PCT/US2022/070091
§ 371 (c)(1),
(2) Date: Jul. 6, 2023

(87) PCT Pub. No.: WO2022/150838
PCT Pub. Date: Jul. 14, 2022

(65) Prior Publication Data
US 2024/0304016 A1    Sep. 12, 2024

(30) Foreign Application Priority Data
Jan. 8, 2021 (IN) ............................. 202121000983

(51) Int. Cl.
*G06V 30/413* (2022.01)
*G06F 16/353* (2025.01)
(Continued)

(52) U.S. Cl.
CPC .......... *G06V 30/413* (2022.01); *G06F 16/353* (2019.01); *G06V 30/19147* (2022.01);
(Continued)

(58) Field of Classification Search
None
See application file for complete search history.

(56) References Cited

U.S. PATENT DOCUMENTS

| 2011/0258182 A1 | 10/2011 | Singh |
| 2019/0292908 A1* | 9/2019 | Karimi Vajargah .... E21B 49/00 |

(Continued)

FOREIGN PATENT DOCUMENTS

| KR | 20170034206 A | 3/2017 |
| KR | 20180065620 A | 6/2018 |
| WO | 2012033511 A1 | 3/2012 |

OTHER PUBLICATIONS

Dharmaratnam, A. "Data Mining Calibration Points from Oilfield Documents using Natural Language Processing and Machine Arguing", MEng Individual Project, Imperial College London, Department of Computing, Jun. 15, 2020, 102 pages.
(Continued)

*Primary Examiner* — Leon Flores
(74) *Attorney, Agent, or Firm* — Jeffrey D. Frantz

(57) ABSTRACT

A method involves extracting, from a file comprising an unstructured oilfield document, terms, calculating term frequency inverse document frequency (TF-IDF) of the terms to generate an input vector, execute a document content classification model on the input vector to generate a document content classification of unstructured oilfield document, and extract table information from a table in the unstructured oilfield document. The method further involves storing, with the file in storage, the document content classification and the table information.

17 Claims, 11 Drawing Sheets

(51) Int. Cl.
  *G06V 30/19*     (2022.01)
  *G06V 30/412*    (2022.01)
  *G06V 30/414*    (2022.01)
  *G06V 30/42*     (2022.01)

(52) U.S. Cl.
  CPC .......... *G06V 30/412* (2022.01); *G06V 30/414* (2022.01); *G06V 30/42* (2022.01); *G06V 2201/10* (2022.01)

(56) References Cited

U.S. PATENT DOCUMENTS

2020/0065387 A1* 2/2020 Matthews ............. G06F 3/0484
2021/0233008 A1* 7/2021 Gupta ................... G06Q 50/02

OTHER PUBLICATIONS

Search Report and Written Opinion of International Patent Application No. PCT/US2022/070091 dated Apr. 26, 2022, 10 pages.
Extended Search Report of European Application No. 22737348.7 dated Oct. 9, 2024, 7 pages.

* cited by examiner

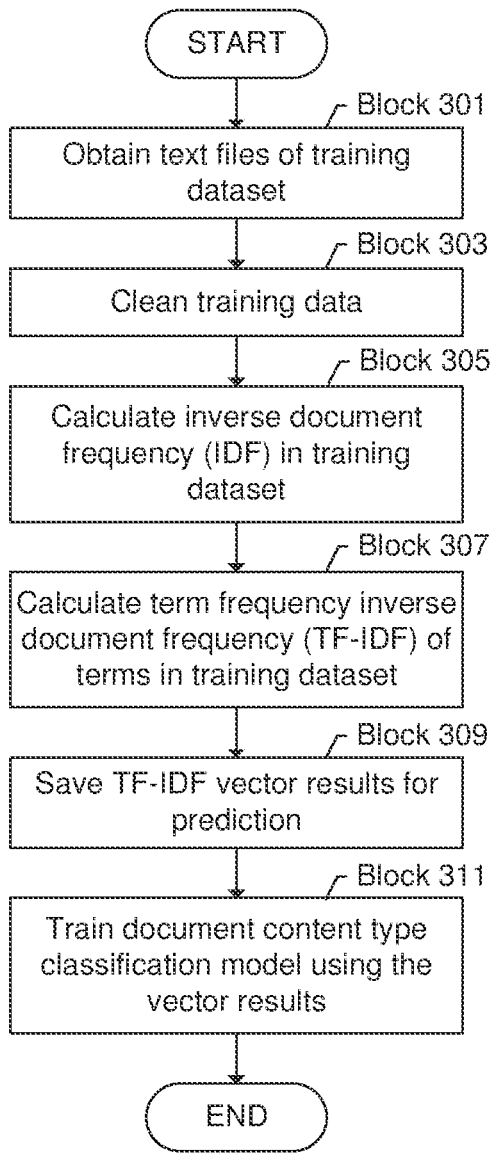
*FIG. 3.1*
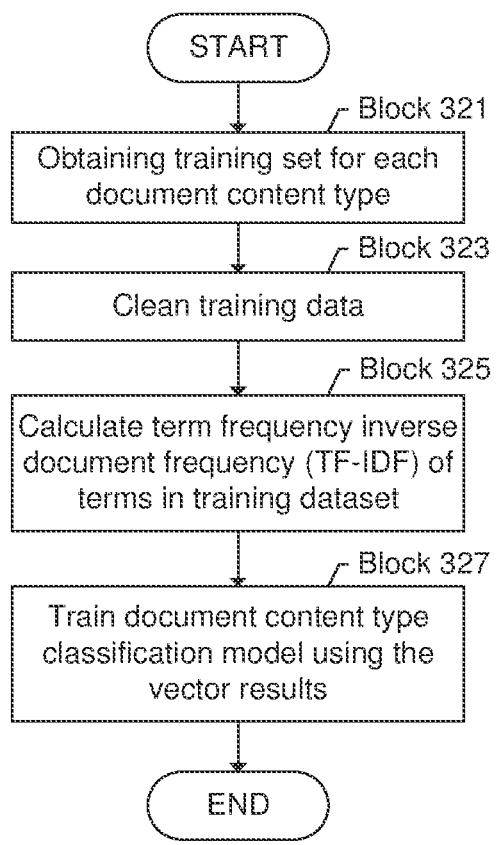
*FIG. 3.2*

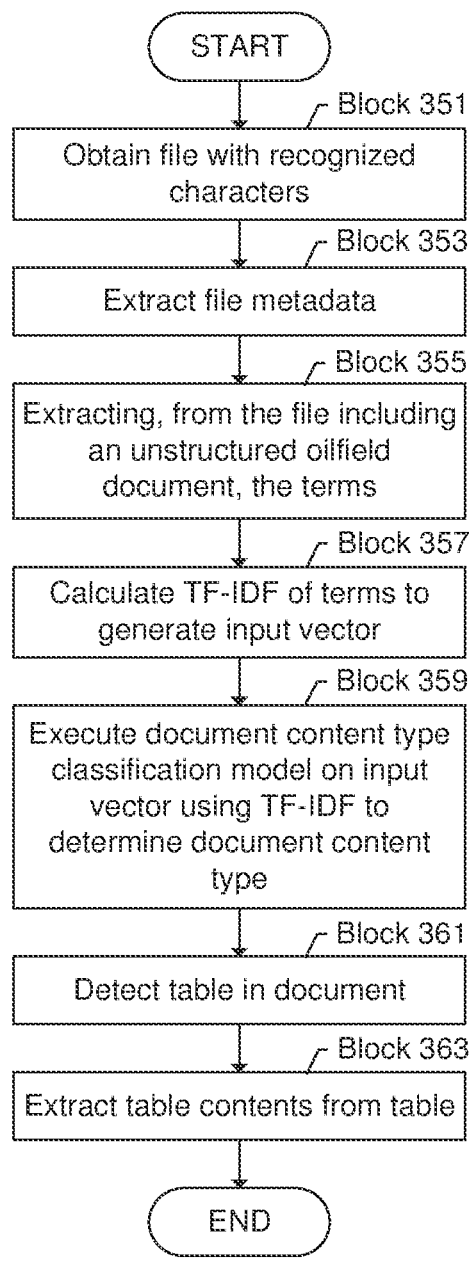
FIG. 3.3

| File Parameters  Log Viewer  Document Viewer | |
|---|---|
| ORIGIN  SUMMARY  CLASSIFICATION  TABLES | |
| CLASS | CONFIDENCE |
| Completion | 58.6339199999999996 |
| Core | 0.287959 |
| Drilling | 35.683932 |
| Geology | 2.7905539999999998 |
| WellTest | 2.603635 |

*FIG. 4*

Extensions
pdf,png,jpeg,jpg,tif,tiff,doc,docx,ppt,pptx,xls,xlsx

☑ Enable Content Extraction  ☑ Enable Document Classification  ☑ Enable Table Extraction

| Similarity Buffer | Page Segmentation Mode | Best Matches |
|---|---|---|
| 0.1 | 4 | 4 |

| Image Resolution | Number of Thread | Section Size |
|---|---|---|
| 200 | 10 | 50 |

Model\*
/apps/microservices/scanner_standalone/document_scanner/DocumentsScannerPackage/models/document_scanner_default_model

Document Classification Model\*
/apps/microservices/scanner_standalone/document_scanner/DocumentsScannerPackage/models/documents_classification_default_model

Content Pages\*
1-10

Data Extraction Control File Path\*
/apps/microservices/scanner_standalone/document_scanner/DocumentsScannerPackage/models/data_extraction_default_controlfile

[Cancel]

*FIG. 5.1*

| Setting | Description |
|---|---|
| "vertical_strategy" | Either "lines", "lines_strict", "text", or "explicit". See explanation below. |
| "horizontal_strategy" | Either "lines", "lines_strict", "text", or "explicit". See explanation below. |
| "explicit_vertical_lines" | A list of vertical lines that explicitly demarcate cells in the table. Can be used in combination with any of the strategies above. Items in the list should be either numbers — indicating the x coordinate of a line the full height of the page — or a dictionary describing the line, with at least the following keys: x, top, bottom. |
| "explicit_horizontal_lines" | A list of vertical lines that explicitly demarcate cells in the table. Can be used in combination with any of the strategies above. Items in the list should be either numbers — indicating the y coordinate of a line the full height of the page — or a dictionary describing the line, with at least the following keys: top, x0, x1. |
| "snap_tolerance" | Parallel lines within snap_tolerance pixels will be "snapped" to the same horizontal or vertical position. |
| "join_tolerance" | Line segments on the same infinite line, and whose ends are within join_tolerance of one another, will be "joined" into a single line segment. |
| "edge_min_length" | Edges shorter than edge_min_length will be discarded before attempting to reconstruct the table. |
| "min_words_vertical" | When using "vertical_strategy": "text", at least min_words_vertical words must share the same alignment. |
| "min_words_horizontal" | When using "horizontal_strategy": "text", at least min_words_horizontal words must share the same alignment. |
| "keep_blank_chars" | When using the text strategy, consider " " chars to be *parts* of words and not word-separators. |
| "text_tolerance", "text_x_tolerance", "text_y_tolerance" | When the text strategy searches for words, it will expect the individual letters in each word to be no more than text_tolerance pixels apart. |
| "intersection_tolerance", "intersection_x_tolerance", "intersection_y_tolerance" | When combining edges into cells, orthogonal edges must be within intersection_tolerance pixels to be considered intersecting. |

*FIG. 52*

| Strategy | Description |
|---|---|
| "lines" | Use the page's graphical lines — including the sides of rectangle objects — as the borders of potential table-cells. |
| "lines_strict" | Use the page's graphical lines — but *not* the sides of rectangle objects — as the borders of potential table-cells. |
| "text" | For vertical_strategy: Deduce the (imaginary) lines that connect the left, right, or center of words on the page, and use those lines as the borders of potential table-cells. For horizontal_strategy, the same but using the tops of words. |
| "explicit" | Only use the lines explicitly defined in explicit_vertical_lines / explicit_horizontal_lines. |

*FIG. 5.3*

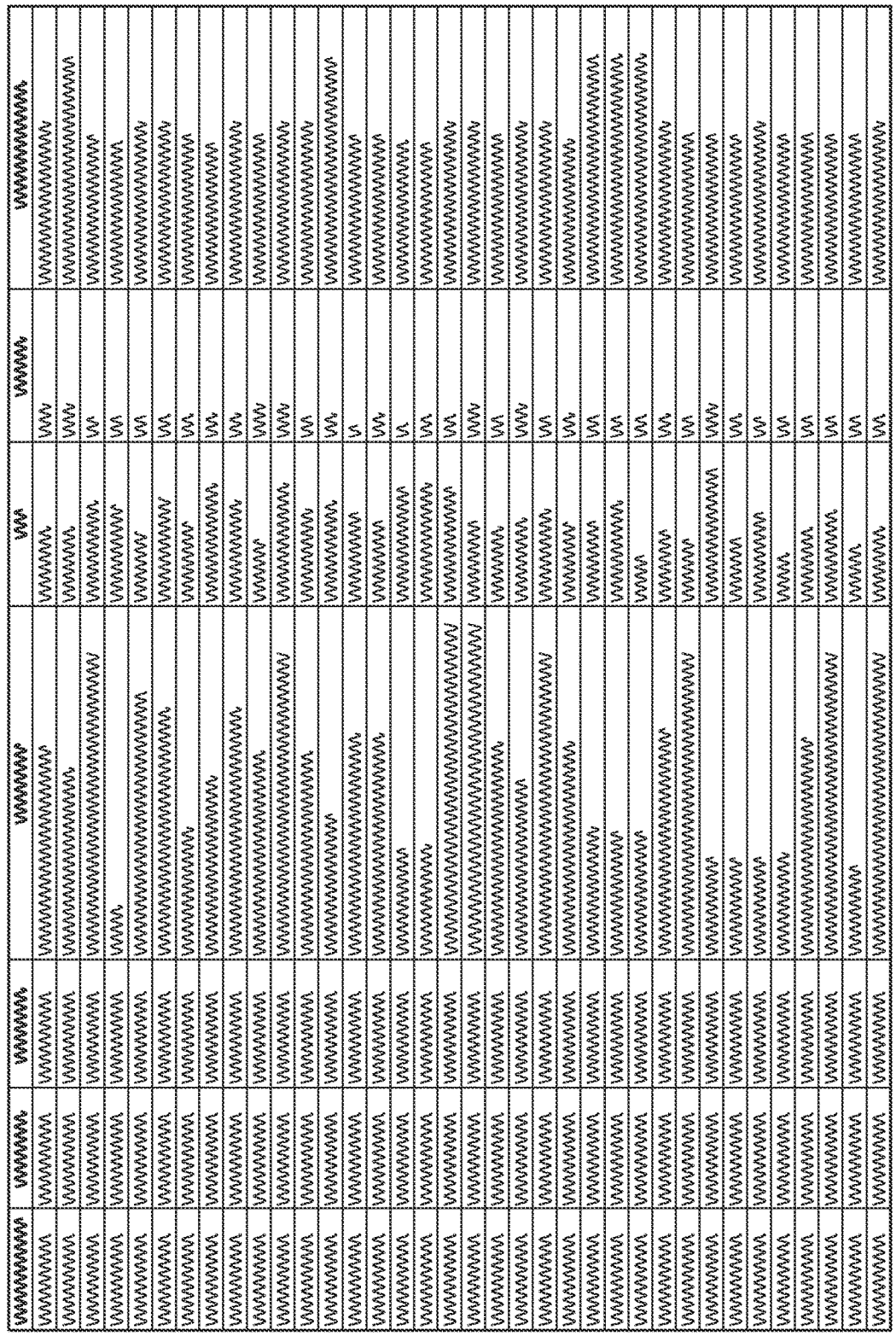
FIG. 5.4

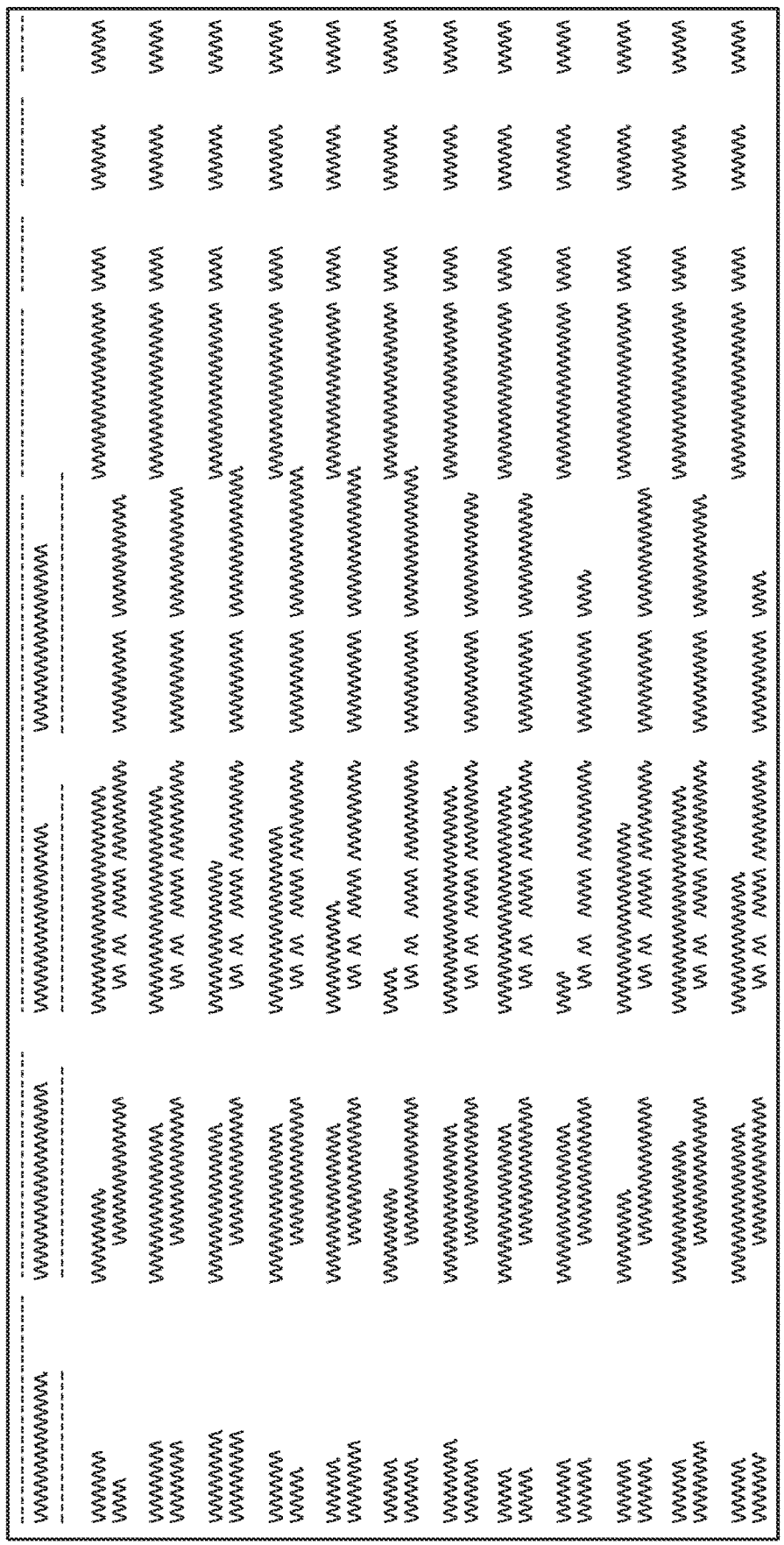
FIG. 5.5

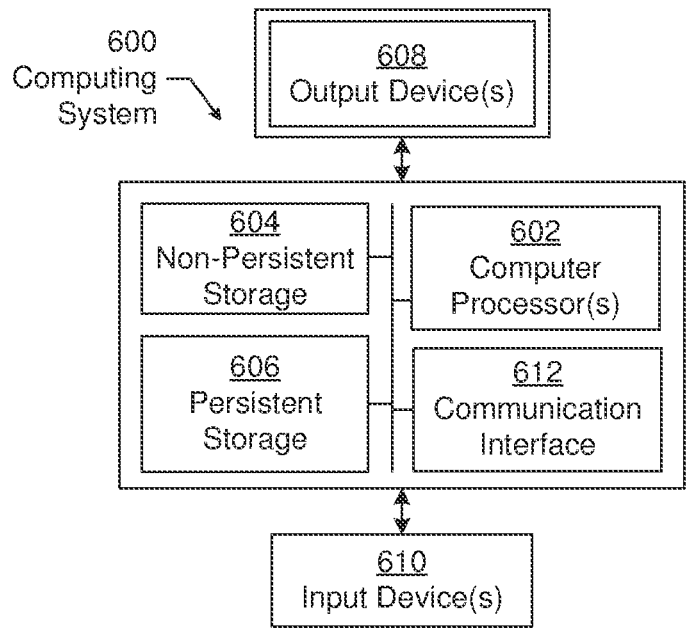
*FIG. 6.1*
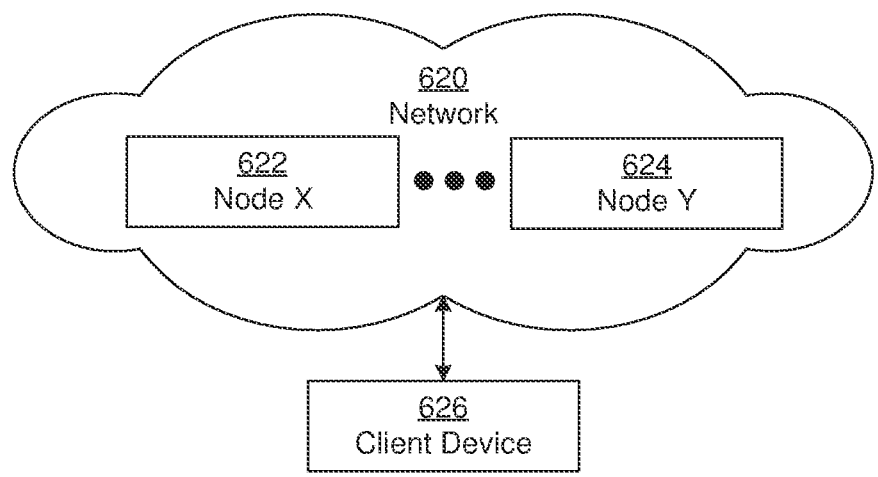
*FIG. 6.2*

EXPLORATION AND PRODUCTION DOCUMENT CONTENT AND METADATA SCANNER

CROSS REFERENCE PARAGRAPH

This application claims the benefit of Indian Non-Provisional Application No. 202121000983, entitled "EXPLORATION AND PRODUCTION DOCUMENT CONTENT AND METADATA SCANNER," filed Jan. 8, 2021, the disclosure of which is hereby incorporated herein by reference.

BACKGROUND

In the oil and gas industry, huge amount of data is received from the field in the form of digital and scanned unstructured oilfield documents. For example, the unstructured oilfield documents can include well completion reports, daily drilling reports, production reports, etc. The various unstructured oilfield documents may be generated by the myriad of employees and exploration and production (E&P) equipment that are with the oilfield company. The various files may be loaded by oilfield companies into a data store. However, once stored, the file can be hidden amongst the plethora of files in storage.

In current scenario, to manage the plethora of files, users open each document, review the file and extract relevant data from that file and attach the relevant data to the document. Thus, the document can be searched.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method comprising extracting, from a file comprising an unstructured oilfield document, terms, calculating term frequency inverse document frequency (TF-IDF) of the terms to generate an input vector, execute a document content classification model on the input vector to generate a document content classification of unstructured oilfield document, and extract table information from a table in the unstructured oilfield document. The method further includes store, with the file in storage, the document content classification and the table information.

Other aspects of the disclosure will be apparent from the following description and the appended claims.

BRIEF DESCRIPTION OF DRAWINGS

FIGS. 3.1, 3.2, and 3.3 show flowcharts in accordance with disclosed embodiments.

FIG. 4 shows an example in accordance with disclosed embodiments.

FIGS. 5.1, 5.2, 5.3, 5.4, and 5.5 show an example in accordance with one or more embodiments.

FIGS. 6.1 and 6.2 show computing systems in accordance with disclosed embodiments.

DETAILED DESCRIPTION

Figure 1:
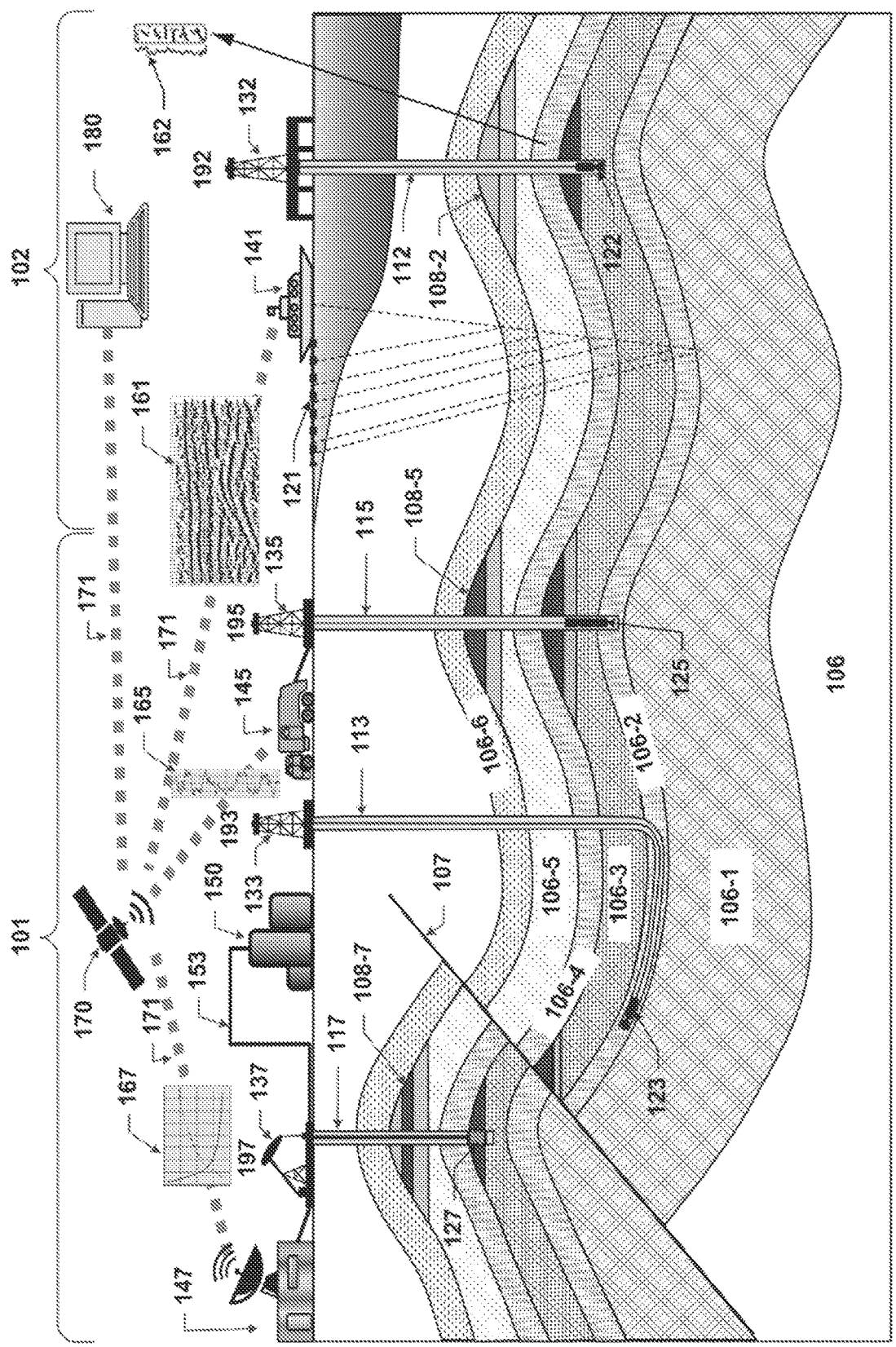
FIG. 1 shows a diagram of a system in accordance with disclosed embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to be a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Exploration and production (E&P) of an oilfield involves uses a variety of software applications (e.g., drilling tool design application, production system design, drilling simulators, production simulators, pipeline management, etc.) and hardware tools. Each of the various tools and applications may generate files having various type of oilfield documents including reports. Without opening the documents and manually scanning the reports, classifying the documents and obtaining tabular data therefrom is a challenge. One or more embodiments are directed to a pluggable lightweight software utility that extracts the relevant metadata and tabular data from the document files.

The pluggable lightweight software utility includes functionality to extract terms from an unstructured oilfield document, use term frequency inverse document frequency (TF-IDF) of the terms to generate an input vector to a classification model. The classification model determines the oilfield document content class from the input vector. The pluggable lightweight software utility is further configured to extract table information from one or more tables in the oilfield document. The document content classification and the table information are stored with the document in storage.

As discussed above, embodiments relate to oilfield documents generated through the various exploration and production (E&P) operations of an oilfield. FIG. 1 depicts a schematic view, partially in cross section, of an onshore field (101) and an offshore field (102) in which one or more embodiments may be implemented. In one or more embodiments, one or more of the modules and elements shown in FIG. 1 may be omitted, repeated, and/or substituted. Accordingly, embodiments should not be considered limited to the specific arrangement of modules shown in FIG. 1.

As shown in FIG. 1, the fields (101), (102) include a geologic sedimentary basin (106), wellsite systems (192), (193), (195), (197), wellbores (112), (113), (115), (117), data acquisition tools (121), (123), (125), (127), surface units (141), (145), (147), well rigs (132), (133), (135), production equipment (137), surface storage tanks (150), production pipelines (153), and an E&P computer system (180) connected to the data acquisition tools (121), (123), (125), (127), through communication links (171) managed by a communication relay (170).

The geologic sedimentary basin (106) contains subterranean formations. As shown in FIG. 1, the subterranean formations may include several geological layers (106-1 through 106-6). As shown, the formation may include a basement layer (106-1), one or more shale layers (106-2, 106-4, 106-6), a limestone layer (106-3), a sandstone layer (106-5), and any other geological layer. A fault plane (107) may extend through the formations. In particular, the geologic sedimentary basin includes rock formations and may include at least one reservoir including fluids, for example the sandstone layer (106-5). In one or more embodiments, the rock formations include at least one seal rock, for example, the shale layer (106-6), which may act as a top seal. In one or more embodiments, the rock formations may include at least one source rock, for example the shale layer (106-4), which may act as a hydrocarbon generation source. The geologic sedimentary basin (106) may further contain hydrocarbon or other fluids accumulations associated with certain features of the subsurface formations. For example, accumulations (108-2), (108-5), and (108-7) associated with structural high areas of the reservoir layer (106-5) and containing gas, oil, water or any combination of these fluids.

In one or more embodiments, data acquisition tools (121), (123), (125), and (127), are positioned at various locations along the field (101) or field (102) for collecting data from the subterranean formations of the geologic sedimentary basin (106), referred to as survey or logging operations. In particular, various data acquisition tools are adapted to measure the formation and detect the physical properties of the rocks, subsurface formations, fluids contained within the rock matrix and the geological structures of the formation. For example, data plots (161), (162), (165), and (167) are depicted along the fields (101) and (102) to demonstrate the data generated by the data acquisition tools. Specifically, the static data plot (161) is a seismic two-way response time. Static data plot (162) is core sample data measured from a core sample of any of subterranean formations (106-1 to 106-6). Static data plot (165) is a logging trace, referred to as a well log. Production decline curve or graph (167) is a dynamic data plot of the fluid flow rate over time. Other data may also be collected, such as historical data, analyst user inputs, economic information, and/or other measurement data and other parameters of interest. The various plots and seismic surveys may be saved as oilfield document files by the various components of FIG. 1.

The acquisition of data shown in FIG. 1 may be performed at various stages of planning a well. For example, during early exploration stages, seismic data (161) may be gathered from the surface to identify possible locations of hydrocarbons. The seismic data may be gathered using a seismic source that generates a controlled amount of seismic energy. In other terms, the seismic source and corresponding sensors (121) are an example of a data acquisition tool. An example of seismic data acquisition tool is a seismic acquisition vessel (141) that generates and sends seismic waves below the surface of the earth. Sensors (121) and other equipment located at the field may include functionality to detect the resulting raw seismic signal and transmit raw seismic data to a surface unit (141). The resulting raw seismic data may include effects of seismic wave reflecting from the subterranean formations (106-1 to 106-6). The data acquisition tools, and software applications connected thereto may generate oilfield document files from the seismic data and other oilfield data, which are then stored in the system.

After gathering the seismic data and analyzing the seismic data, additional data acquisition tools may be employed to gather additional data. Data acquisition may be performed at various stages in the process. The data acquisition and corresponding analysis may be used to determine where and how to perform drilling, production, and completion operations to gather downhole hydrocarbons from the field. Generally, survey operations, wellbore operations and production operations are referred to as field operations of the field (101) or (102). These field operations may be performed as directed by the surface units (141), (145), (147). For example, the field operation equipment may be controlled by a field operation control signal that is sent from the surface unit. Field operations are stored in document files as production data.

Further as shown in FIG. 1, the fields (101) and (102) include one or more wellsite systems (192), (193), (195), and (197). A wellsite system is associated with a rig or a production equipment, a wellbore, and other wellsite equipment configured to perform wellbore operations, such as logging, drilling, fracturing, production, or other applicable operations. For example, the wellsite system (192) is associated with a rig (132), a wellbore (112), and drilling equipment to perform drilling operation (122). In one or more embodiments, a wellsite system may be connected to a production equipment. For example, the well system (197) is connected to the surface storage tank (150) through the fluids transport pipeline (153).

In one or more embodiments, the surface units (141), (145), and (147), are operatively coupled to the data acquisition tools (121), (123), (125), (127), and/or the wellsite systems (192), (193), (195), and (197). In particular, the surface unit is configured to send commands to the data acquisition tools and/or the wellsite systems and to receive data therefrom. In one or more embodiments, the surface units may be located at the wellsite system and/or remote locations. The surface units may be provided with computer facilities (e.g., an E&P computer system) for receiving, storing, processing, and/or analyzing data from the data acquisition tools, the wellsite systems, and/or other parts of the field (101) or (102). The surface unit may also be provided with, or have functionality for actuating, mechanisms of the wellsite system components. The surface unit may then send command signals to the wellsite system components in response to data received, stored, processed, and/or analyzed, for example, to control and/or optimize various field operations described above.

In one or more embodiments, the surface units (141), (145), and (147) are communicatively coupled to the E&P computer system (180) via the communication links (171). In one or more embodiments, the communication between the surface units and the E&P computer system may be managed through a communication relay (170). For example, a satellite, tower antenna or any other type of communication relay may be used to gather data from multiple surface units and transfer the data to a remote E&P computer system for further analysis. Generally, the E&P computer system is configured to analyze, model, control, optimize, or perform management tasks of the aforementioned field operations based on the data provided from the surface unit. In one or more embodiments, the E&P computer system (180) is provided with functionality for manipulating and analyzing the data, such as analyzing seismic data to determine locations of hydrocarbons in the geologic sedimentary basin (106) or performing simulation, planning, and optimization of E&P operations of the wellsite system. In one or more embodiments, the results generated by the E&P computer system may be displayed for user to view the results in a two-dimensional (2D) display, three-dimensional (3D) display, or other suitable displays. Although the surface units are shown as separate from the E&P computer system in FIG. 1, in other examples, the surface unit and the E&P computer system may also be combined.

In one or more embodiments, the E&P computer system (180) is implemented by an E&P services provider by deploying applications with a cloud-based infrastructure. As an example, the applications may include a web application that is implemented and deployed on the cloud and is accessible from a browser. Users (e.g., external clients of third parties and internal clients of the E&P services provider) may log into the applications and execute the functionality provided by the applications to analyze and interpret data, including the data from the surface units (141), (145), and (147). The E&P computer system and/or surface unit may correspond to a computing system, such as the computing system shown in FIGS. 6.1 and 6.2 and described below. The various parts of the E&P computer system may also generate and store various oilfield document files.

Figure 2:
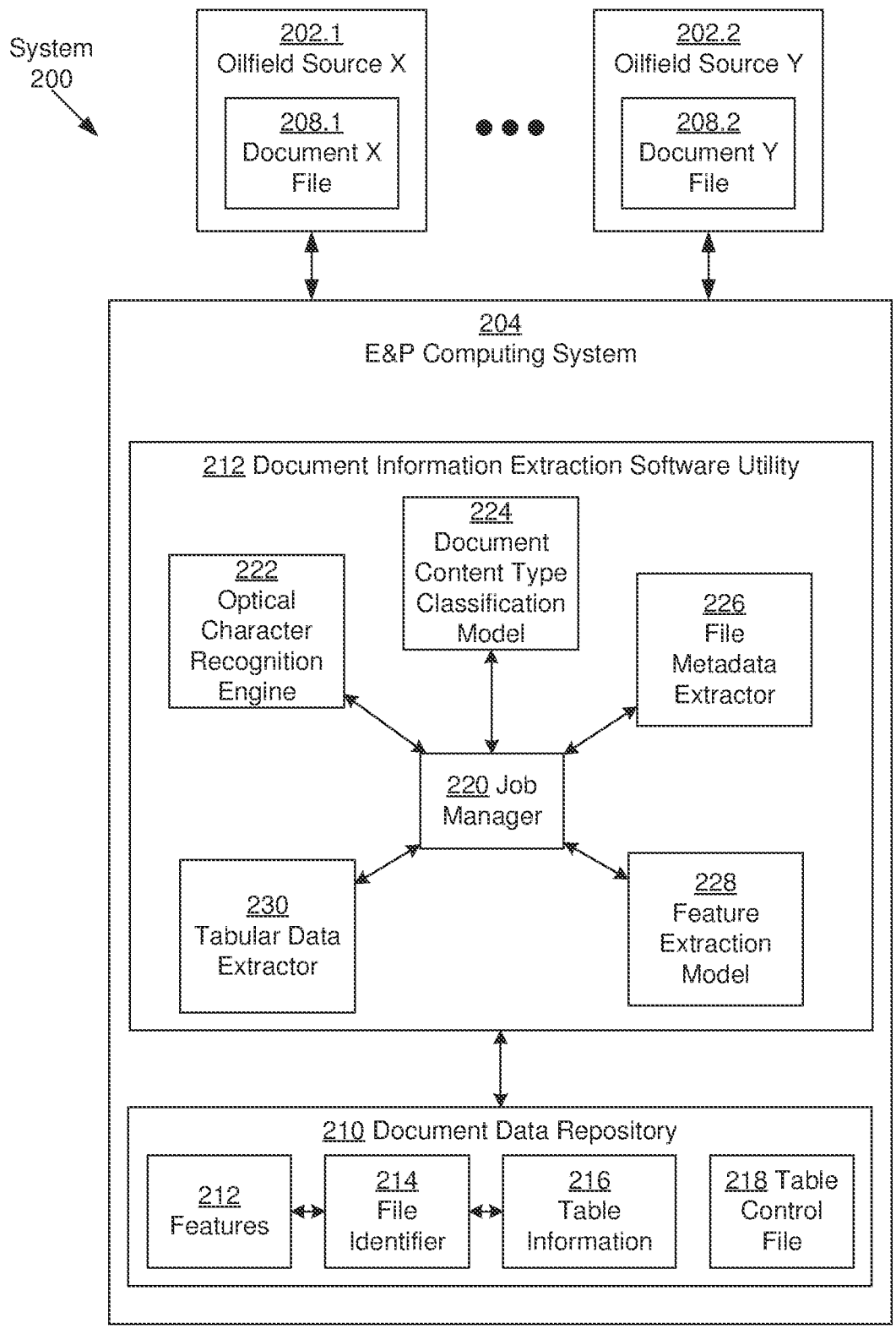
FIG. 2 shows a diagram of an E&P computer system in accordance with disclosed embodiments.

FIG. 2 shows a system (200) in accordance with one or more embodiments of the disclosure. As shown in FIG. 2, the system (200) includes oilfield sources (e.g., oilfield source X (202.1), oilfield source Y (202.2)) connected to an E&P computing system (204). The oilfield sources include the various components of the field shown in FIG. 1 and include the E&P computing system (204). The oilfield sources include functionality to create document files (e.g., document X file (208.1), document Y file (208.2)). The file (i.e., document file) is the computer version of the file that stores the contents of the file. The document is the contents in the file. For example, the documents may include well completion reports, daily drilling reports, production reports, etc., stored in separate files. The number of document files increases based on the number of wells and fields.

The document files may be scanned filed or text and graphics-based files. Further, the document files may include one or more tables. Broadly speaking, a table is a collection of entries organized into rows and columns, whereby the location of the entry with respect to a row and column dictates how the entry should be interpreted. Tables may have various border structures or no borders around entries. When a table does not have a border, whitespace and entry alignment may be used to dictate the location of contents in the table.

The oilfield sources are communicatively connected to the E&P computing system (204). The E&P computing system (204) include a document data repository (210) and document information extraction software utility (212). The document data repository (210) is any type of storage unit and/or device (e.g., a file system, database, collection of tables, or any other storage mechanism) for storing data. Further, the document data repository (210) may include multiple different storage units and/or devices. The multiple different storage units and/or devices may or may not be of the same type or located at the same physical site.

The document data repository (210) includes functionality to store a file identifier (212), features (214), table information (216), and table control file (218). The file identifier (212) is a unique identifier of the file. For example, the file identifier (212) may be the full pathname of the file or an alphanumeric identifier. The file identifier (212) is a unique identifier in the document data repository (210).

The features (212) of the file include the descriptive terms in the file and the document content class of the document in the file. The descriptive terms are single words or phrases in a document that provide information about the document. The extracted descriptive terms are one or more words that provide information as to the contents of the document. The extracted descriptive terms that are extracted include specific terms to the oilfield. For example, the extracted descriptive terms may be terms that include the name of the field, the location of a wellsite, a wellsite name, device identifiers of devices referenced in the field, water depth, drilling depth, type of rock, name of drilling rig, and other information that is specific to E&P operations. The document content class is a classification of the type of document in the file. For example, the document content class may be daily drilling summary, completion report, core report, drilling report, well test report, or other type of report.

The file identifier (214) is further related to table information in the document data repository (210). In one or more embodiments, the table information (216) includes the extracted contents of tables in the document. In particular, the table information includes a unique identifier of the table, entries, and the relationship between entries in the table. In one or more embodiments, the table information is a comma separated value (CSV) file. The CSV file may include a first set of values having header information and subsequent values are the values of the entries.

The table control file (218) are files that provide parameters for extracting the table information. For example, the table control file (218) may specify whether boundaries exist between cells, snap tolerance, number of terms for a cell, and other configuration information to extract the table information.

The document data repository (210) is connected to a document information extraction software utility (212). The document information extraction software utility is a lightweight pluggable utility that is configured to extract documents from files. For example, the document information extraction software utility (212) may be written in the Python® programming language (Python® is a registered trademark of the Python Software Foundation). The document information extraction software utility (212) includes a job manager (220), an optical character recognition engine (222), a document content type classification model (224), a file metadata extractor (226), a feature extraction model (228), and a tabular data extractor (230).

The job manager (220) is a software tool configured to manage the execution of a particular job. The job, for example, may be the processing of a single document file or a collection of document files. Thus, the job manager (220) may track the execution.

The optical character recognition (OCR) engine (222) is a software tool configured to recognize individual characters from images of characters. In some embodiments, the OCR engine (222) is an interface to an external software tool (i.e., external to the document information extraction software utility) that performs the OCR functionality.

The document content type classification model (224) is a machine learning model that is configured to determine the document content type based on features (212) of the document. The document content type is the type of the content within the document. Notably, the document content type is distinct from the file type that specifies the encoding of the file and is distinct from the document type that may only specify the generic type of document (e.g., report). The document content type is an oilfield specific type that defines the contents of the document. For example, the document content type may be drilling log, production log, daily production report, well completion report, geochemistry lab report, seismic report, or other document content type. The document content type classification model (224) may be a TD-IDF model coupled to a Bayesian classifier. The Bayesian classifier may operation on a feature vector generated by the TD-IDF model.

The file metadata extractor (226) is configured to extract metadata from the file. The file metadata includes the size of the file, modified and creation dates of the file, access permissions to read, write, modify, and print the file, the datatype of the file, and other information about the file that is present in the metadata of the model.

The feature extraction model (228) is configured to extract features (212) from the document. The feature extraction model (228) may include a parser that is configured to parse the document. The feature extraction model (228) may also include a dictionary and a set of regular expressions that are configured to extract features matching a regular expression. The dictionary is a collection of terms that may be included in the analysis and a set of terms to be excluded from analysis. The included terms are terms that may be indicative of the document content type. The excluded terms are terms that do no serve to distinguish between document content types, such as common terms in oilfield industry that is not indicative of a particular type of report. The regular expressions are rules for extracting terms that do not match the dictionary but are indicative of document content type.

The tabular data extractor (230) is configured to extract entries from tables and store the table in the table information. In one or more embodiments, the tabular data extractor (230) extracts the header information and the entries of the table along with the relationships between entries. The tabular data extractor (230) may be configured to operate on an image version of the table in addition to a table encoded format of the table. The image version of the table has lines and whitespaces for borders, whereby identification of entries is based on lines and whitespaces. The table encoded version includes a computer encoded characters between entries to specify the beginning and end of entries.

While FIG. 2 shows configurations of components, other configurations may be used without departing from the scope of the disclosure. For example, various components may be combined to create a single component. As another example, the functionality performed by a single component may be performed by two or more components.

FIGS. 3.1, 3.2, and 3.3 shows flowcharts in accordance with one or more embodiments of the disclosure. FIG. 3.1 shows a flowchart for training the machine learning model of the TF-IDF model. FIG. 3.2 shows a flowchart for training document content type classification model. FIG. 3.3 shows a flowchart for performing the document information extraction on a new document file. One or more of the blocks in FIGS. 3.1, 3.2, and 3.3 may be performed by the components (e.g., the document information extraction software utility (212) of the system (200)) discussed above in reference to FIG. 2. In one or more embodiments, one or more of the blocks shown in FIGS. 3.1, 3.2, and 3.3 may be omitted, repeated, and/or performed in parallel, or in a different order than the order shown in FIGS. 3.1, 3.2, and 3.3. Accordingly, the scope of the disclosure should not be considered limited to the specific arrangement of blocks shown in FIGS. 3.1, 3.2, and 3.3.

At Block 301, text files of a training dataset are received. The text files are files with recognized text present. For example, the text files may be document files in which OCR has been performed. In some embodiments, the document files in the training dataset are the ASCII files, having the content information which user is interested e.g. if the objective is to find the well and associated information, the training data must contain set of information that describes a drilling of the well.

At Block 303, the training dataset is cleaned. For training, the cleaning extracts only terms that make sense and deletes the remaining terms. Thus, for example, the cleaning at Block 303 may include removing the extra white spaces between the words from each document file of training data, removing special characters and number from each document file of training data, and tokenizing the terms in each document file of training data. The terms are stored in a list (e.g. total number of document files in the training dataset is "n" and each document file of training data contains "y" number of terms. Thus, the list is created with "n" rows with each row having a one-dimensional array of size "y."

At Block 305, the inverse document frequency (IDF) in the training dataset is calculated. As discussed above, the total number of words in the entire training dataset is [n*y], where n number of rows created during the cleaning process. To calculate the IDF, the number of unique tokens (terms) in the list is calculated. Consider the case in which the total number of unique tokens in the list of size [n*y] is "z".

The IDF is calculated for each step, where IDF means inverse document-frequency as defined below in equation Eq. 1.

$$idf(t) = \log\frac{1+n}{1+df(t)} + 1 \qquad \text{Eq. 1}$$

In Eq. 1, n is the total number of documents in the document set, and df(t) is the number of documents in the document set that contain term t.

The IDF of each token is saved as one of the training files which is used to predict the document content type from the documents, the total number of IDFs is "z," which is equal to the number of tokens.

At Block 307, the term frequency inverse document frequency (TF-IDF) of terms in the training dataset. The TF-IDF is calculated for each term stored in two-dimensional array (i.e. the values for TD-IDF calculated for each unique token is stored in the array of size [n*y]). The TF-IDF is calculated using equation Eq. 2.

$$tf\text{-}idf(t,d) = tf(t,d) \times idf(t) \qquad \text{Eq. 2}$$

In Eq. 2, tf(t,d) is the term frequency of the term in the particular document. Thus, tf-idf(t,d) is the term frequency of the term in the document multiplied by the inverse document frequency for the term.

At Block 309, the TF-IDF vector results are saved for prediction. The results of IDF and Tf-IDF together is considered as one machine learning model which is further used to predict the relevant information from the input data. A user can train a separate machine learning model based on the information given training dataset, containing the data of interest. The document information extraction software utility includes a script that enables a user to train their own model, by performing the tasks described above.

At Block 311, the document content type classification model is trained using the vector results. FIG. 3.2 shows a flowchart for training the document content type classification model.

At Block 321, a training dataset for each document content type is received. The training dataset is a set of document files that are pre-classified into document content types. Namely, each of the document files in the training dataset are related in the training data set with the document content type matching the document file. Thus, if there are three document content types: "Completion documents", "Geology documents", "Core documents", then a training dataset includes the three document content types with each document file related to the particular document content type. For example, the user may provide three separate directories as an input whereby each directory includes data related to the respective class.

At Block 323, the training dataset is cleaned. For training, the cleaning extracts only terms that make sense and deletes the remaining terms. Thus, for example, the cleaning at Block 323 may include removing the extra white spaces between the words from each document file of training data, removing special characters and number from each document file of training data, and tokenizing the terms in each document file of training data. The terms are stored in a list. The total number of document files in the training data is "n*c", where "n" is the number of files in each category class and "c" is the total number of document content types. Each document file of training data contains "y" number of terms. Thus, the list is created with "n*c" rows, with each row having a one-dimensional array of size "y". In some embodiments, the terms are compared against a dictionary of terms, such as a dictionary of English terms, oilfield terms, and acronyms to confirm that the terms are correct. In one or more embodiments, the total number of words in the entire training dataset is [(n*c)*y], where (n*c) number of rows created in the cleaning phase.

At Block 325, the TF-IDF is calculated. The TF-IDF may be calculated as discussed above with reference to Block 307 and 309 of FIG. 3.1.

At Block 327, the document content type classification model is trained using the vector results. In one or more embodiments, the document content type classification model is a naïve Bayes classifier. Thus, the document content type classification model may be of the form defined in equation Eq. 3.

$$P(c \mid x) = \frac{P(x \mid c)P(c)}{P(x)} \quad \text{Eq. 3}$$

In Eq. 3, P(c|x) is the posterior probability of document content type (c, target) given predictor (x, features), P(c) is the prior probability of document content types, P(x|c) is the likelihood which is the probability of predictor given class, and P(x) is the prior probability of predictor. The TF-IDF calculated in Block 325 is used to train the Naïve Bayes classification, which is then stored as a separate training file which is used to classify the documents. In some embodiments, file metadata extracted from the documents in the training dataset are added as features to the input vectors that are used to train the document content type classification model.

FIG. 3.3 shows a flowchart for performing document information extraction in accordance with one or more embodiments. At Block 351, a document file with recognized characters is obtained. If the oilfield document is a scanned document, then an OCR engine is executed on the document to convert the document to a document with recognized text.

At Block 353, file metadata is extracted. The file metadata is the data transmitted with the document file. Each piece of file metadata is individually extracted and stored as a feature with the file identifier.

At Block 355, from the document file that includes the unstructured oilfield document, the terms are extracted. The document file is parsed to identify terms of the document. The terms include single words that are extracted based on whitespace and punctuation. The terms may further include multiple word terms that are extracted based on matching a term in a dictionary of terms, based on grammatical part of speech of the words, or based on usage (e.g., being a recognized title in the document). Extracting the terms may be performed as discussed above with reference to Block 301 and 303 of FIG. 3.1.

At Block 357, the TF-IDF of the terms are calculated to generate an input vector. Calculating the TF-IDF may be performed as discussed above with reference to FIG. 3.1. In some embodiments, the file metadata is added to the input vector. For example, the file metadata are additional features of the model. For some features, adding the file metadata is based on threshold ranges. For example, document files may be separated by thresholds of number of bytes into long files, medium length files, and short files. The feature added to the input vector may be long, medium or short. Similar processing may be performed for modification dates. For example, a last modified date/time may be converted to a timespan in the day or month in which the time of last modification occurred. Thus, documents generated in the evening local time may have a different feature value than documents generated in the morning local time whereas documents generated during a time range defined for the evening are mapped to the same value.

At Block 359, the document content type classification model is calculated on the input vector. For example, the naïve Bayes classifier for each document content type may be executed on the input vector to obtain a probability that the document content is of the particular document content type.

Further, at Block 361, a table in the document is detected. Detecting the table in the document may be performed based on whitespaces or borders. For example, the table control file may be obtained to identify the configuration of tables in the file. Based on the table control file, the table is identified.

At Block 363, the table contents are extracted from the table. A bounding box is generated around the table. If the table control file specifies that are used, then the lines may be used to extract the rows of the table. Otherwise, vertical distances between entries are compared with line spacing to determine whether vertically adjacent lines are part of the same entry. Similarly, columns may be extracted based on lines, spacing, and alignment. For example, vertically aligned words may be considered to be part of the same column. Once rows and columns are identified, entries are determined from the rows and columns and transformed into a column separated file.

The resulting information is stored. Thus, the resulting information may be used to extract further information from the documents.

FIG. 4 shows an example output in the graphical user interface (400) of the document content classification model. As shown in the example, the document content type may be one of the completion class, core class, drilling class, geology class, and welltest class. The output of the document content classification model indicates that the document is likely in the completion class by about 56.6%. The document content classification model also outputs a confidence that the particular example document is in the drilling class by about 35.7%.

FIG. 5.1 shows an example of the graphical user interface (500) for configuring the document information extraction software utility. As shown in FIG. 5.1, the user may specify parameters, such as extensions to extract, image resolution for OCR, the pages for performing OCR, number of threads for example, the location of the document content classification model (i.e., document classification model in FIG. 5.1), TF-IDF model to extract terms, and the location to store the results.

FIG. 5.2 shows a table (510) of parameters in the table control file that may be used to extract table contents. The user may specify values for any of the parameters in FIG. 5.2 and the system may extract table content as discussed above in Block 363 of FIG. 3.3 using those parameters.

FIG. 5.3 shows a table (520) of automated table extraction strategies to apply when extracting rows and columns. The table extraction strategies may be applied in Block 363 of FIG. 3.3.

FIG. 5.4 and FIG. 5.5 show example tables that may be extracted by the tabular data extractor. The wavy lines in FIGS. 5.4 and 5.5 represent alphanumeric characters in actual tables. For example, the table in FIG. 5.4 may include information about companies and employees, where the first three columns are dates of certain events, the fourth column includes the company names, the fifth column is the location of the company, the sixth column is a number of employees, and the seventh column is another attribute. The table in FIG. 5.5 may be a table of information about particular pieces of equipment, whereby each column is an attribute of the equipment. For the purposes of the disclosure, the attribute values are represented as wavy lines rather than the particular values. As shown, the table (530) in FIG. 5.4 includes lines for borders and the table (540) of FIG. 5.5 does not.

Embodiments of the disclosure may be implemented on a computing system. Any combination of mobile, desktop, server, router, switch, embedded device, or other types of hardware may be used. For example, as shown in FIG. 6.1, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (622) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (620), such as a touchscreen, keyboard, mouse, microphone, touchpad, electronic pen, or any other type of input device.

The communication interface (622) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system (600) in FIG. 6.1 may be connected to or be a part of a network. For example, as shown in FIG. 6.2, the network (620) may include multiple nodes (e.g., node X (622), node Y (624)). Each node may correspond to a computing system, such as the computing system shown in FIG. 6.1, or a group of nodes combined may correspond to the computing system shown in FIG. 6.1. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (600) may be located at a remote location and connected to the other elements over a network.

Although not shown in FIG. 6.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6.1. Further, the client device (626) may include and/or perform at least a portion of one or more embodiments of the disclosure.

The computing system or group of computing systems described in FIGS. 6.1 and 6.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system in FIG. 6.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (including layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 6.1, while performing one or more embodiments of the disclosure, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 6.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents a few examples of functions performed by the computing system of FIG. 6.1 and the nodes and/or client device in FIG. 6.2. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method comprising: obtaining, for a plurality of oilfield document content classes, a training set comprising a plurality of documents; calculating an inverse document frequency from the plurality of documents in the training set; calculating term frequency inverse document frequency (TF-IDF) of terms in the training data set to generate a plurality of TF-IDF vector results related to a plurality of document content classes; training the document content type classification model using the plurality of TF-IDF vector results; extracting, from a file comprising an unstructured oilfield document, a plurality of terms; calculating TF-IDF of the plurality of terms to generate an input vector; executing a document content classification model on the input vector to generate a document content classification of unstructured oilfield document; extracting table information from a table in the unstructured oilfield document; and storing, with the file in storage, the document content classification and the table information.

2. The method of claim 1, wherein the document content classification comprises:
    a plurality of document content classes each associated with a corresponding probability of the unstructured oilfield document being in the document content class.

3. The method of claim 1, wherein extracting table information comprises:
    detecting a table in the unstructured oilfield document;
    generating a bounding box around the table;
    detecting a plurality of rows and a plurality of columns of the table using the bounding box;
    extracting contents from the plurality of rows and the plurality of columns;

interrelating the contents in the plurality of rows to obtain related contents; and storing the related contents in a comma separated value file.

4. The method of claim 3, further comprising:
obtaining, from a table control file, a table parameter of the table, wherein the table parameter specifies whether the table comprises a plurality of vertical lines,
detecting the plurality of vertical lines in the table based on the table parameter; and
wherein detecting the plurality of columns is performed using the plurality of vertical lines.

5. The method of claim 3, further comprising:
obtaining, from a table control file, a table parameter of the table, wherein the table parameter specifies whether the table comprises a plurality of horizontal lines,
detecting the plurality of horizontal lines in the table based on the table parameter; and
wherein detecting the plurality of columns is performed using the plurality of horizontal lines.

6. The method of claim 1, further comprising:
obtaining a control file comprising:
a model specification of the document type classification model, and
a data extraction control file path specifying a location to store the document content classification and the table information.

7. The method of claim 1, further comprising:
extracting file metadata of the file; and
cataloging the unstructured oilfield document using the file metadata.

8. A system comprising: memory; and a processor for executing computer readable code configured to perform operations comprising: obtaining, for a plurality of oilfield document content classes, a training set comprising a plurality of documents; calculating an inverse document frequency from the plurality of documents in the training set; calculating term frequency inverse document frequency (TF-IDF) of terms in the training data set to generate a plurality of TF-IDF vector results related to a plurality of document content classes; training the document content type classification model using the plurality of TF-IDF vector results; extracting, from a file comprising an unstructured oilfield document, a plurality of terms, calculating TF-IDF of the plurality of terms to generate an input vector, executing a document content classification model on the input vector to generate a document content classification of unstructured oilfield document, extracting table information from a table in the unstructured oilfield document, and storing, with the file in storage, the document content classification and the table information.

9. The system of claim 8, wherein the document content classification comprises:
a plurality of document content classes each associated with a corresponding probability of the unstructured oilfield document being in the document content class.

10. The system of claim 8, wherein extracting table information comprises:
detecting a table in the unstructured oilfield document;
generating a bounding box around the table;
detecting a plurality of rows and a plurality of columns of the table using the bounding box;
extracting contents from the plurality of rows and the plurality of columns;
interrelating the contents in the plurality of rows to obtain related contents; and
storing the related contents in a comma separated value file.

11. The system of claim 10, the operations further comprising:
obtaining, from a table control file, a table parameter of the table, wherein the table parameter specifies whether the table comprises a plurality of vertical lines,
detecting the plurality of vertical lines in the table based on the table parameter; and
wherein detecting the plurality of columns is performed using the plurality of vertical lines.

12. The system of claim 10, the operations further comprising:
obtaining, from a table control file, a table parameter of the table, wherein the table parameter specifies whether the table comprises a plurality of horizontal lines,
detecting the plurality of horizontal lines in the table based on the table parameter; and
wherein detecting the plurality of columns is performed using the plurality of horizontal lines.

13. The system of claim 8, the operations further comprising:
obtaining a control file comprising:
a model specification of the document type classification model, and
a data extraction control file path specifying a location to store the document content classification and the table information.

14. The system of claim 8, the operations further comprising:
extracting file metadata of the file; and
cataloging the unstructured oilfield document using the file metadata.

15. A non-transitory computer readable medium comprising instructions that, when executed by a computer processor, perform operations comprising: obtaining, for a plurality of oilfield document content classes, a training set comprising a plurality of documents; calculating an inverse document frequency from the plurality of documents in the training set; calculating term frequency inverse document frequency (TF-IDF) of terms in the training data set to generate a plurality of TF-IDF vector results related to a plurality of document content classes; training the document content type classification model using the plurality of TF-IDF vector results; extracting, from a file comprising an unstructured oilfield document, a plurality of terms; calculating TF-IDF of the plurality of terms to generate an input vector; executing a document content classification model on the input vector to generate a document content classification of unstructured oilfield document; extracting table information from a table in the unstructured oilfield document; and storing, with the file in storage, the document content classification and the table information.

16. The non-transitory computer readable medium of claim 15, wherein the document content classification comprises:
a plurality of document content classes each associated with a corresponding probability of the unstructured oilfield document being in the document content class.

17. The non-transitory computer readable medium of claim 15, wherein extracting table information comprises:
detecting a table in the unstructured oilfield document;
generating a bounding box around the table;
detecting a plurality of rows and a plurality of columns of the table using the bounding box;
extracting contents from the plurality of rows and the plurality of columns;

interrelating the contents in the plurality of rows to obtain related contents; and storing the related contents in a comma separated value file.

* * * * *